May 13, 1941.　　　L. S. WILLIAMS　　　2,241,693
MEASURING DEVICE
Filed Nov. 10, 1939
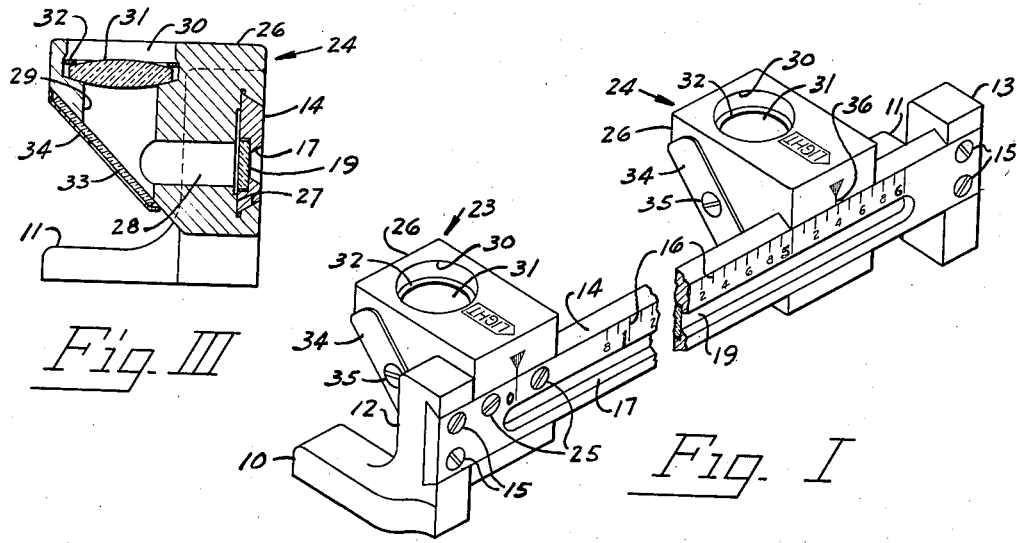
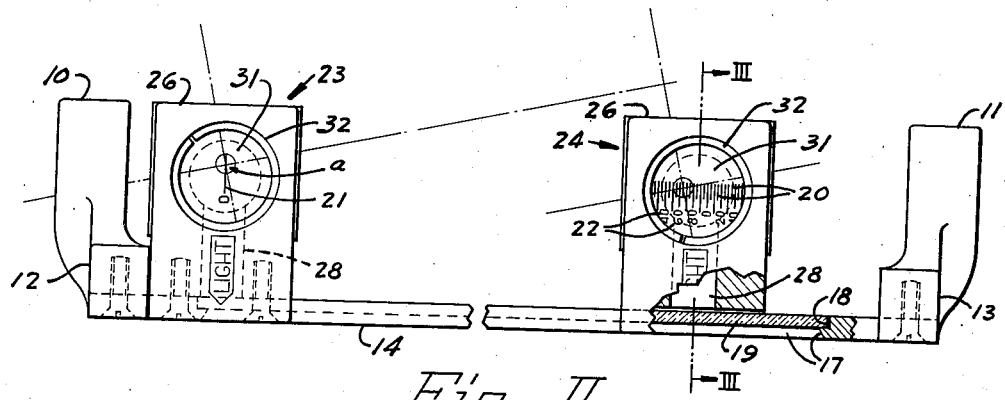
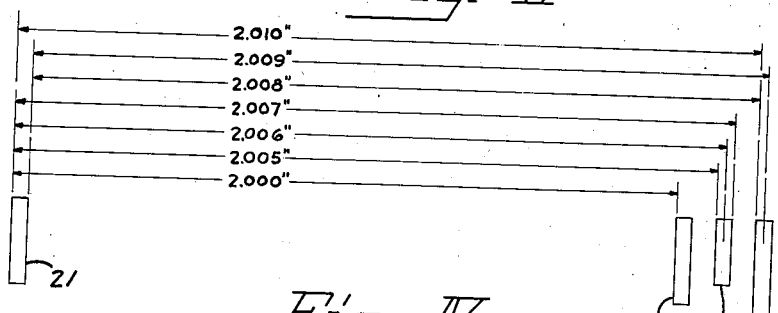
Lawrence S. Williams
INVENTOR
BY Marshall & Marshall
ATTORNEYS Patented May 13, 1941

2,241,693

UNITED STATES PATENT OFFICE 2,241,693

MEASURING DEVICE

Lawrence S. Williams, Toledo, Ohio, assignor to Toledo Scale Company, a corporation of New Jersey Application November 10, 1939, Serial No. 303,735

6 Claims. (Cl. 88—2.3)

This invention relates generally to measuring devices, and more particularly to devices for accurately determining the distance between two spaced points. In "laying out" work-pieces, that is marking the centers for holes to be drilled or bored, determining distances for other operations within a tolerance of one-thousandth of an inch or for checking the same after they are "laid out" it was heretofore necessary to resort to manually set micrometers, vernier gauges or other precision instruments. The use of such instruments however is time consuming, they require a great deal of skill from the operator and unless great care is taken the operator may easily misread the "setting" of the instrument or make mistakes in setting dividers or calipers used for transferring such determined dimension.

The principal object of this invention is, therefore, the provision of improved means for determining the distance between two points and in which such measurements are visually indicated.

Another object is the provision of a measuring instrument which is compact, portable, relatively inexpensive to produce and capable of being utilized by persons having only ordinary mechanical skill.

Another object is the provision of improved means in which a fiducial mark and a point whose distance is to be determined is made to appear in coincidence with a brilliantly illuminated scale marking which overlies the object being measured and can be observed without parallax.

A further object is the provision of improved means by which an object to be measured can be viewed in unobscured detail in conjunction with a pair of graduated measuring scales.

A still further object is the provision of improved means for equally magnifying a portion of an object to be measured and an image of a graduated scale which appears superimposed upon said object; and, A still further object is the provision of improved magnifying means which cause said portion of said object and said image to appear uninverted.

Other objects and advantages will be apparent from the following description in which reference is had to the accompanying drawing, illustrating a preferred embodiment of the invention and wherein similar reference numerals refer to similar parts throughout the several views.

In the drawing—

Fig. I is a perspective view of the device embodying the invention, a portion of the scale bar being broken away.

Fig. II is an enlarged plan view thereof.

Fig. III is an enlarged, sectional view through the movable observation head substantially along the line III—III of Fig. II.

Fig. IV is a diagram illustrating a method whereby dimensions to .001 of a unit of mensuration may be accurately determined with a scale graduated to .005 of such unit of mensuration.

Referring to the drawing in detail:

The device comprises a pair of supporting feet 10 and 11 having integral upwardly extending posts 12 and 13 respectively. These posts are connected by a scale bar 14, the edges of which are beveled to fit into the dovetailed slots. Countersunk screws 15, extending through the scale bar into the upwardly extending posts 12 and 13, securely lock these members into a unit. The bar 14, adjacent its upper beveled edge, is provided with a series of graduations 16 and their designating numerals. These graduations may be engraved, etched or marked thereon in any suitable manner and in this embodiment represent inches subdivided into tenths. The scale bar 14 has an elongated, longitudinally extending slot 17 and a recess 18 milled in its rear face. In this recess is cemented a strip of glass 19 having a substantially opaque coating on its rear face in which are provided a series of transparent scale graduations 20 including a zero or fiducial mark 21. These markings represent subdivisions of the .1" graduations on the scale bar 14. Each graduation represents .005" and each .020" is designated by a numeral 22. The outer or front face of this strip of glass is preferably frosted to diffuse the light shining through the transparent markings 20 for a reason which will later become clear.

Supported on the scale bar 14 are a pair of optical devices or observation heads 23 and 24. These heads are duplicates with the exception that the head 23 is fixed in position on the bar 14 by means of screws 25, while the head 24 is slidable thereon. These heads comprise a body portion 26, preferably a die casting either of metal or synthetic plastic material and are in the shape of a substantially rectangular block having a dovetailed slot 27 extending across its face for the reception of the bar 14. A horizontally extending passage 28 in the body 26 terminates in a vertical passage 29. The upper end of the passage 29 opens into an enlarged, undercut, counterbored opening 30 in which a magnifying lens 31 is retained by a split resilient washer 32. The axes of the passages 28 and 29 intersect and are perpendicular to each other.

The lower rear portion of the body 26 is cut away at an angle of approximately 45° and the aperture 29 is covered by a transparent diagonal mirror 33 which is retained in this position by a bezel 34 fastened to the side walls of the body 26 by means of screws 35. The horizontally extending passage 28, when the head is mounted on the bar 14, is located in alignment with the longitudinally extending slot 17 in the bar 14 so that light falling through this longitudinally extending slot in the bar 14 will illuminate the scale graduations 20 and their designating numerals 22 on the glass strip 19 and the transparent mirror 33 will reflect the image which is visible through the lens 31. The translucent frosting on the outer face of the strip 19, as previously mentioned, diffuses the light thus obviating glare in the reflected image.

It is not contemplated to provide special illuminating means, the natural or artificial illumination of the room in which the device is employed is sufficient although it is preferred that when in use the device face the direction from which the room is principally lighted.

Since the perpendicular distance from any point on the strip 19, which carries the graduations 20 and 21, to a point on the mirror 33, is the same as the distance from that point on the mirror to the plane of the flat bottoms of the feet 10 and 11, hence if the device is standing upon a flat surface the reflected image of graduations 20 and 21, as viewed through the lens 31, appear to lie upon the flat surface that supports the device, the graduations and any markings upon the surface upon which the device stands being magnified to the same extent.

The slight diminution of light from below the mirror as the light is transmitted through its reflecting surface emphasizes the contrast between the scale image and the field.

The position of the zero or fiducial mark 21 on the strip 19 is such that its image is reflected in the field of vision of the fixed observation head 23. Since, as previously mentioned, the observation head 24 is slidable on the bar 14 it is provided with an engraved index 36 on its front for cooperation with the series of graduations 16 on the bar 14.

Assuming that it is desired to locate the centers of two holes exactly 5.365" apart which are to be bored or drilled in a plate or other workpiece, the operator first establishes the center of the first hole a (Fig. II) and then places the device embodying the present invention so that the reflected image of the fiducial mark 21 in the observation head 23 overlies this center. Since the image of this mark reflected on the transparent mirror when viewed through the lens 31 appears to be in coincidence with the surface of the work-piece and without parallax the device may be positioned with great accuracy. The device may then be clamped to the work-piece, or otherwise held, and the observation head 24 moved on the bar 14 until its index 36 is in registration with graduation 16 representing the nearest tenth of an inch of the distance required which, in this example, is 5.3". The last fraction of the dimension, namely .065", is then determined with the aid of the reflected image of the graduations on the strip 19 which now appear to be lying on the surface of the workpiece. Since the graduations on the strip 19 are the subdivisions of the tenths graduations on the bar 14 and their zero numerals 22 are in registration with each tenth graduation it is not necessary to bring the index 36 on the head 24 into exact alignment with the nearest tenth graduation; in fact, it is preferred that the observation head 24 be adjusted along the bar 14 until the image of the required graduation 20 on the strip is located approximately in the center of the field of the lens 31.

The absence of the requirement of exact alignment of the index 36 with the graduations 16 clearly obviates a source of error. Although the scale on the scale strip 19 is graduated to .005", dimensions to .001" are definitely determinable. This, however, requires that each of the graduations 20, 21 have a width of .002" and there be a clear interval of .003" between them.

Assuming that a distance of 2.005" is to be determined, the device is so positioned that the outer or left-hand edge of the magnified image of the zero graduation 21, visible through the lens 31 in the head 23, is in registration with the starting point on the work-piece, this may be a scribed line or a punch mark, and the head 24 moved on the bar 14 until the index 36 is in registration with that graduation 16 representing the nearest tenth of an inch—in this example, it is the 2" graduation. The remaining .005" are directly indicated by the left-hand edge of the .005" graduation, as diagrammatically indicated in Fig. IV. Since the width of this graduation is .002" a distance of 2.006" is indicated by the center of this graduation, which in its magnified condition can be readily estimated, and 2.007" by its right-hand edge. To determine 2.008", the device is shifted so that the right-hand edge of the image of the zero mark 21 is in registration with the aforementioned starting point on the workpiece, and without moving the head 24, the distance is indicated by the left-hand edge of the next adjacent graduation on the right, and the distance 2.009" by the center of this graduation, as clearly shown in Fig. IV.

The embodiment of the invention herein shown and described is to be regarded as illustrative only, and it is to be understood that the invention is susceptible to variation, modification and change within the spirit and scope of the subjoined claims.

Having described the invention, I claim:

1. In a device for determining space dimensions, in combination, a frame adapted to rest upon the surface of an object to be measured, a flat translucent scale having a series of graduations representing units of a system of mensuration marked thereon, mounted vertically on said frame, said series of graduations having a zero or fiducial graduation, an optical device mounted upon said frame in fixed relation to said flat translucent scale adapted to expose to view a magnified image of said zero or fiducial graduation of said series and a portion of the surface of the object upon which the device is resting, a second optical device mounted upon said frame adapted to be manually shifted to expose to view a magnified image of another graduation of said series on said translucent scale and another portion of the surface of the object upon which the device is resting, said optical devices comprising a lens, the axis of said lens being parallel to the plane of the vertically mounted translucent scale, a plane transparent mirror mounted with the plane of said mirror lying substantially at an angle of forty-five degrees to the plane of said translucent scale and intersecting the axis of said lens at an angle of forty-five degrees, there being open spaces between said mirror and said scale and said mirror and said lens whereby such magnified image appears to be lying on the surface of the object when viewed through said lens.

2. In a device for determining space dimensions, in combination, a frame adapted to rest upon an object, a flat translucent scale mounted in said frame, a pair of optical devices positioned upon said scale and adapted to be moved relative to each other and parallelly to said scale, each of said optical devices having a magnifying lens mounted so that it is parallel with the horizontal plane of said flat translucent scale and each optical device having a flat transparent mirror, the planes of said mirrors lying substantially at an angle of 45° to the vertical face of said translucent scale and intersecting the axes of said lenses substantially at an angle of 45°, each of said lenses simultaneously exposing to view a magnified reflected image of a portion of said flat translucent scale and a portion of the surface of the object upon which said frame is resting, and said flat translucent scale comprising a photographic negative having a translucent frosting applied to one of its faces.

3. In a device for determining space dimensions, in combination, a frame adapted to rest upon an object, a flat translucent scale mounted in said frame, a pair of optical devices positioned upon said scale and adapted to be moved relative to each other and parallelly to said scale, each of said optical devices having a magnifying lens mounted so that its axis is parallel with a plane of said flat translucent scale and each optical device having a flat transparent mirror, the plane of said mirror lying substantially at an angle of 45° to a plane of said translucent scale and intersecting the axes of said lenses substantially at an angle of 45° and each of said lenses simultaneously exposing to view a magnified reflected image of a portion of said flat translucent scale and a portion of the surface of the object upon which said frame is resting.

4. In a device for determining spaced dimensions, in combination, a frame adapted to rest upon an object, a flat translucent scale mounted in said frame, and a pair of optical devices positioned upon said frame and adapted to be moved relative to each other and parallelly to said scale, each of said optical devices having a magnifying lens and each optical device having a flat transparent mirror, the plane of said mirror in each optical device lying at a substantial angle to the plane of said translucent scale and intersecting the axis of the lens of its optical device at a substantial angle, each of said lenses simultaneously exposing to view a magnified reflected image of a portion of said flat translucent scale and a magnified portion of the surface of the object upon which the frame is resting, the magnified portion of such surface being seen through said transparent mirror and appearing together with the reflected image of the portion of said scale.

5. In a device of the class described, in combination, a frame comprising an elongated bar having a foot at each of its ends, an optical unit fixedly mounted upon said bar adjacent one of its ends, a second optical unit slidably mounted upon said bar, each of said optical units comprising a body having a substantially horizontally extending passage and a substantially vertically extending passage and a diagonally positioned semitransparent mirror positioned so that its reflecting surface is at the intersection of the longitudinal axes of said passages, scale markings on said elongated bar positioned so that images of such markings are reflected by said diagonally positioned semitransparent mirrors, and a lens in each of said optical units for magnifying said reflected images, said scale markings and said transparent mirrors being so positioned that the reflected images of said markings appear to lie upon the surface of an object upon which the said feet of the device are standing when said reflected images are viewed through said magnifying lenses.

6. In a device of the class described, in combination, a frame comprising an elongated bar having a foot at each of its ends, an optical unit fixedly mounted upon said bar adjacent one of its ends, a second optical unit slidably mounted upon said bar, each of said optical units comprising a body having a substantially horizontally extending passage and a substantially vertically extending passage and a diagonally positioned semitransparent mirror positioned so that its reflecting surface is at the intersection of the longitudinal axes of said passages, scale markings on said elongated bar positioned so that images of such markings are reflected by said diagonally positioned semitransparent mirrors, a lens in each of said optical units for magnifying said reflected images, said scale markings and said transparent mirrors being so positioned that the reflected images of said markings appear to lie upon the surface of an object upon which the said feet of the device are standing when said reflected images are viewed through said magnifying lenses, and means for positioning said second optical unit at a predetermined distance from the first said optical unit whereby the reflected images of said markings visible through said optical units cooperate to determine linear dimensions on surfaces of such objects with magnified accuracy.

LAWRENCE S. WILLIAMS.